United States Patent
Prokisch et al.

(10) Patent No.: US 8,003,071 B2
(45) Date of Patent: Aug. 23, 2011

(54) PROCESS FOR PRODUCING ELEMENTAL SELENIUM NANOSPHERES

(75) Inventors: József Prokisch, Debrecen (HU); Mohsen A. Zommara, Alexandria (EG)

(73) Assignee: Dr. Aliment Kft., Kecskemét (HU)

( * ) Notice: Subject to any disclaimer, the term of this patent is extended or adjusted under 35 U.S.C. 154(b) by 0 days.

(21) Appl. No.: 12/669,238

(22) PCT Filed: Jul. 15, 2008

(86) PCT No.: PCT/IB2008/052838
§ 371 (c)(1), (2), (4) Date: Mar. 25, 2010

(87) PCT Pub. No.: WO2009/010922
PCT Pub. Date: Jan. 22, 2009

(65) Prior Publication Data
US 2010/0189634 A1    Jul. 29, 2010

(30) Foreign Application Priority Data
Jul. 16, 2007   (HU) ..................... 0700480

(51) Int. Cl.
*C01B 19/02* (2006.01)
(52) U.S. Cl. ........ 423/508; 424/780; 424/702; 977/773; 977/810
(58) Field of Classification Search .................. 977/773, 977/810; 423/508; 424/780, 702
See application file for complete search history.

(56) References Cited

U.S. PATENT DOCUMENTS

| 2007/0077238 A1* | 4/2007 | Teo et al. ................... 424/93.45 |
| 2010/0189634 A1* | 7/2010 | Prokisch et al. .............. 423/510 |

FOREIGN PATENT DOCUMENTS
RU    2171034 C2 *  7/2001

OTHER PUBLICATIONS

Yoonsoon Shin et al. "Synthesis and stabilization of selenium nanoparticles on cellulose nanocrystal" Materials Letters vol. 61 (2007) pp. 4297-4300.*
T. L. Gerrard et al. "Deteection of Selenium Deposits in *Escherichia coli* by Electron Microscopy" Journal of Bacteriology, Sep. 1974, vol. 119, No. 3, pp. 1057-1060.*
Carlos Garbisu et al. "Bacterial reduction of selenite to elemental selenium" Chemical Geology, vol. 132, (1996), pp. 199-204.*
CN 10195461 A published Jan. 2, 2008 (English abstract only).*
CN 1947540 A published Apr. 18, 2007 (English abstract only).*
CN 1803012 A published Jul. 19, 2006 (English abstract only).*

\* cited by examiner

*Primary Examiner* — Timothy C Vanoy
(74) *Attorney, Agent, or Firm* — Jason D. Voight

(57) ABSTRACT

The invention relates to microbiological processes using non-selenium-respiring bacteria for the production of elemental selenium nanospheres having a size in the 50-500 nm range and compositions comprising said nanospheres. The invention further concerns grey elemental selenium nanospheres directly obtainable by the processes of the invention. The compositions and materials of the invention are useful, in particular, as food additives and for use as raw material in the microelectronic and optical industries.

20 Claims, 2 Drawing Sheets

PROCESS FOR PRODUCING ELEMENTAL SELENIUM NANOSPHERES

This is the National Phase of PCT/IB2008/052838, filed Jul. 15, 2008.

FIELD OF THE INVENTION

The present invention relates to microbiological processes using non-selenium-respiring bacteria for the production of elemental selenium nanospheres having a size in the 50-500 nm range and compositions comprising said nanospheres. The invention further concerns grey elemental selenium nanospheres directly obtainable by the processes of the invention. The compositions of the invention are useful, in particular, as food additives and for use as raw material in the microelectronic and optical industries.

BACKGROUND OF THE INVENTION

Up-to-date materials engineering demands production of high purity metals having homogeneous particle-size distribution in the range of from 50 to 500 nm. Homogeneous size and form, as well as spherical shape are preferred for microelectronic and pharmaceutical technologies. Among these, elemental selenium plays a significant role. Elemental selenium has more known allotropic modifications: red colored amorphous and crystalline selenium, as well as metallic grey selenium. The electric conductivity of grey selenium increases up to thousand fold by illumination. Consequently, it is extensively used, for example, as material of photo sensor detectors and photocopiers.

Furthermore, selenium is an essential micronutrient for animals and humans, but in higher dose it can be toxic. In humans, selenium is a trace element which functions as cofactor for reduction of antioxidant enzymes such as glutathione peroxidases and certain forms of thioredoxin reductase found in animals and some plants. Bioavailability and toxicity are strongly related to the chemical form of selenium (Hartikainen, H. 2005: Biogeochemistry of selenium and its impact on food chain quality and human health. J. Trace Elem. Med. Biology 18: 309-318.). Inorganic selenium(IV) is less toxic than selenium(VI) in the soil plant system as it was described by Széles (Széles, É. 2007: Selenium-Speciation In Soil And Plant Samples Doctoral thesis University of Debrecen). Organic selenium forms are less toxic but highly bioavailable forms, therefore they have significant importance in functional foods, food and feed supplements. Some plant, like cabbage and onion can convert the inorganic selenium to organic, but others can not. Yeast is applied for the industrial production of selenium-methionine from inorganic selenium, but we have limited information about the conversion of inorganic selenium by bacteria (Rayman, M. P. 2004: The use of high-selenium yeast to raise selenium status: how does it measure up? Br J Nutr., 92: 557-573).

Selenium is a metalloid element that is chemically similar to sulfur and tellurium and in nature exists in four oxidation states, −2, 0, +4, and +6. The last two states occur in aqueous media as the soluble oxyanions selenite [$SeO_3^{2-}$ or Se(IV)] and selenate [$SeO_4^{2-}$ or Se(VI)]. Selenium also has unusual photo-optical and semiconducting physical properties and has industrial applications in devices such as photocopiers and microelectronic circuits. Recent interest in the field of nanotechnology has stimulated research into the chemical synthesis of selenium nanowires that are composed of elemental selenium [Se(0)] (Abdelouas, A., W. L. Gong, W. Lutze, J. A. Shelnutt, R. Franco, and I. Moura. 2000. Using cytochrome cc3 to make selenium nanowires. Chem. Mater. 12:1510-1512; Gates, B., B. Mayers, B. Cattle, and Y. Xia. 2002. Synthesis and characterization of uniform nanowires of trigonal selenium. Adv. Funct. Mater. 12:219-227; Gates, B., B. Mayers, B. Grossman, and Y. Xia. 2002. A sonochemical approach to the synthesis of crystalline selenium nanowires in solutions and on solid supports. Adv. Mater. 14:1749-1752).

Disadvantageously, chemically manufactured metal particles have irregular shape, generally the produced crystals are surrounded by edges, and the particles' size varies in a wide range. The capability of selenium-respiring bacteria to produce elemental selenium has been disclosed in the art but only in strictly anaerobic conditions, and in microorganisms isolated from geological and environmental samples.

To date, more than 15 diverse species of Bacteria and Archaea have been described that grow anaerobically by linking the oxidation of organic substrates or $H_2$ to the dissimilatory reduction of selenium oxyanions (Oremland, R. S., and J. F. Stolz. 2000. Dissimilatory reduction of selenate and arsenate in nature, p. 199-224. In D. R. Lovley (ed.), Environmental metal-microbe interaction. ASM Press, Washington, D.C., Stolz, J. F., and R. S. Oremland. 1999. Bacterial respiration of selenium and arsenic. FEMS Microbiol. Rev. 23:615-627). The end products of these reactions are the red, amorphous or monoclinic allotropes of Se(0), which accumulate in spent medium because the microorganisms reduce the 10 to 20 mM selenate or selenite provided to Se(0). Respiratory reductases for Se oxyanions contain molybdenum and are associated with the plasma membrane (18).

Reports on the reduction of selenite to elemental selenium by sulphate reducing, selenium-respiring bacteria has been published first time in the 1990s (Tomei, F. A., Barton, L. L., Lemanski, C. L., Zocco, T. G., Fink, N. H., Sillerud, L. O., 1995. Transformation of selenate and selenite to elemental selenium by *Desulfovibrio desulfuricans*. J. Ind. Microbiol. 14, 329-336.). The possibility of industrial application of the analyzed bacteria has not been investigated, and its industrial adaptability has not been considered. In 1999 J. Kessi et al. (J. Kessi, m. Ramuz, E. Wehrli, M. Spycher, and R. Bachofen (1999) Reduction of Selenite and Detoxification of Elemental Selenium by the Phototrophic Bacterium *Rhodospirillum rubrum* Applied and Environmental Microbiology, November 1999, Vol. 65, No. 11. p. 4734-4740) used anaerobic phototrophic purple non-sulphur bacterium called *Rhodospirillum rubrum* in their experiments, which can be found in still waters and swamps in nature, and which is also able to bind elemental nitrogen of the atmosphere. This bacterium utilizes $CO_2$, $H_2$ and $NH_3$ in anaerobic conditions while using sulphate as source of sulphur. Medium used in experiments contained 40-120 mg/L selenium in the form of sodium selenite. The reduction process' duration was 60-80 hours. In the process orange-red colored amorphous selenium was produced. Disadvantageously, the size of the so formed selenium spheres varied in wide range depending on conditions, ranging from 50 to 200 nm in a single specimen.

In 2003, R. S. Oremland et al. examined the capability of three anaerobic, selenium-respiring bacteria (*Sulfurospirillum barnesii, Bacillus selenitireducens* and *Selenihalanaerobacter shriftii*) to produce elemental selenium (Ronald S. Oremland, Mitchell J. Herbel, Jodi Switzer Blum, Sean Langley, Terry J. Beveridge, Pulickel M. Ajayan, Thomas Sutto, Amanda V Ellis, Seamus Curran (2003) Structural and Spectral Features of Selenium Nanospheres Produced by Se-Respiring Bacteria Applied and Environmental Microbiology, Vol. 70, No. 1 Jan. 2004, p. 52-60). Bacteria analyzed were anaerobic organisms living in watery environment. It has been found that the species analyzed produced red colored selenium forms characterized by molecular formulae S8 and S6. The drawback of the process is that it can only be used for producing the red form, and as yet there is no established practice and experience for the industrial application of the employed organisms.

In 2004, G. Sarret et al. evaluated the selenium production of selenium-respiring soil bacterium *Ralstonia metallidurans* (Geraldine Sarret, Laure Avoscan, Marie Carriere, Richard Collins, Nicolas Geoffroy, Francine Carrot, Jacques Coves, Barbara Gouget (2004) Chemical Forms of Selenium in the Metal-Resistant Bacterium *Ralstonia metallidurans* CH34 Exposed to Selenite and Selenate Applied and Environmental Microbiology, Vol. 71, No. 5 May 2005, p. 2331-2337). They found that the time required for production of elemental selenium in medium comprising selenium in the form of sodium selenite was 100-120 hours, which is a significantly long duration. Klonowska et al. have reported the selenite producing capability of the selenium-respiring bacterium Shewanella in 2005 (Klonowska, A., Heulin, T., Vermeglio, A., 2005. Selenite and tellurite reduction by *Shewanella oneidensis*. Appl. Environ. Microbiol. 71, 5607-5609.). *Shewanella*, unlike many other microorganisms, does not grow on oxygen and nutrients, but catabolizes metals and excretes free electrons as by-products. This bacterium can live in soil and water as well, and is able to select proper energy source among diverse materials. There are drawbacks of employing this bacterium, namely the absence of an established practice of its industrial application, furthermore, its proliferation is much slower than that of other strains used in industrial fermentation processes.

In a report published in 2007 by Lee et al. investigated effects of temperature and dissolved oxygen on seleniumproducing mechanism of the selenium-respiring *Shewanella* sp. strain HN-41 (Ji-Hoon Lee, Jaehong Han, Heechul Choi, Hor-Gil Hur (2007). Effects of temperature and dissolved oxygen on Se(IV) removal and Se(0) precipitation by *Shewanella* sp. HN-41 Chemosphere, doi:10.1016/j.chemosphere. 2007.02.062 in press). The red selenium spheres produced by the bacterium were sized 150-200 nm, and its size was not controllable by oxygen supply.

Summarizing, it can be stated that in each work performed in the art, the ability of anaerobic, selenium-respiring bacteria originating from soil, water or geological samples to produce elemental selenium was investigated. Investigators didn't consider or suggest this microbiological approach as potentially resulting in a suitable industrial scale method for producing elemental selenium nanospheres. Selenium nanosphere producing strains described in the art are all seleniumrespiring bacteria producing elemental selenium in anaerobic conditions as a result of their anaerobic respiratory activity, none of which bacteria is used for industrial production; introduction of such bacteria into industrial scale production would raise numerous problems as manipulations with pathogenic and/or toxic microorganisms require specific conditions and licenses.

In each so far investigated case, the microbiologically produced selenium was red selenium microbial production of the grey modification of selenium is not known in the art. In each case, production of elemental selenium required 80-200 hours. Medium generally contained 100-200 mg/L selenium in the form of sodium selenite.

DEFINITIONS

The terms given in the following are used in both the specification and the claims in the below-defined meaning even if a person skilled in the pertinent art would naturally attribute to said terms somewhat different meaning for any reason.

In the context of the present invention the term "elemental selenium nanospheres" means elemental selenium particles having approximately spherical shape and an average diameter in the range of 50-500 nm.

As used herein, the term "selenium-respiring bacteria" means bacteria that are capable of growing anaerobically (i.e. in the absence of molecular oxygen) by linking the oxidation of organic substrates or $H_2$ to the dissimilatory reduction of selenium oxyanions, i.e. by using selenium oxyanions as a sole electron acceptor for respiration. Alternatively, in the presently used sense, "non-selenium-respiring bacteria" means any bacteria that are incapable of growing anaerobically (i.e. in the absence of molecular oxygen), by using the oxidative potential of selenium oxyanions exclusively (i.e. by linking the oxidation of organic substrates or $H_2$ to the dissimilatory reduction of selenium oxyanions) instead of that of molecular oxygen or, in other words, using selenium oxyanions as a sole electron acceptor. A person skilled in the pertinent art, therefore, can easily differentiate between seleniumrespiring and non-selenium-respiring bacteria by testing the capability of any bacteria of growing in the absence of molecular oxygen and in the presence of selenite and/or selenate ions as a sole oxidative force (i.e. sole usable electron acceptor).

In the present context, a microbiological fermentation process is said to be performed in "aerobic conditions" if during the performance of the said process no step is taken to eliminate or close out oxygen comprised in the air, i.e. molecular oxygen is allowed to be present.

A potentially toxic or growth inhibiting substance in the present context is said to be present in a microbial growth medium in a "non-limiting concentration" if said concentration of said substance does not significantly inhibit or slow down the growth of a microorganism of interest being also present in said growth medium.

A time period being "sufficiently long for the formation of spherical elemental selenium inclusion bodies within bacteria of interest" lasts at least to the time when an observable part of the cultured bacteria starts the production of detectable elemental selenium inclusion bodies, and is not longer than a period compared to which, by applying a longer incubation period in the same culturing system, it is not possible to significantly elevating the yield of the produced inclusion bodies in an acceptably economical manner. The starting time of the production of detectable elemental selenium inclusion bodies within a given bacterium culture can easily be determined by a person skilled in the pertinent art without undue experimentation by appropriate sampling of the culture and analyzing the samples taken by e.g. the use of a scanning electron microscope.

A bacterium species is said to be "permitted for use in the food industry" if said species is officially allowed for use in at least one food industrial method by the Food Administration Office of at least one EU member country.

SUMMARY OF THE INVENTION

Even though the prior art has not comprised or anyway suggested the use of any non-selenium-respiring bacteria for producing elemental selenium nanoparticles, we have highly surprisingly found that obligate aerobic, non-selenium-respiring bacteria grown in the presence of non-limiting concentrations of selenite anions, under aerobic conditions are capable of producing spherical elemental selenium inclusion bodies. This finding is, in fact, very surprising in the light of the present teaching of the art because bacterial elemental selenium nanoparticle production was so far generally thought to be the direct result of the dissimilatory respiratory selenite or selenate reduction of selenium-respiring bacteria which, obviously can not be case for aerobic non-selenium-respiring bacteria used according to the invention.

Even more surprisingly, we have also found that several species of the examined aerobic non-selenium-respiring bacteria (e.g. *Bifidobacterium bifidum* or *Bifidobacterium longum*) are capable of producing the grey crystalline form of elemental selenium which is so far unprecedented in the art for any bacteria capable of producing elemental selenium nanoparticles.

Our finding, therefore, enables the first time the development of economical industrial bacterial fermentation based processes for the production of a high quality elemental selenium material comprising uniformly sized grey or red nanospheres having an average diameter in the range of 50-500 nm.

We have further found that several species of probiotic bacteria (e.g. *Lactobacillus bulgaricus, Lactobacillus acidophillus, Bifidobacterium bifidum, Streptococcus thermophilus, Lactobacillus casei, Lactobacillus rhamnosus, Bifidobacterium longum*) also used in food industry for making yoghurts and, in fact, all species of aerobic bacteria we have examined so far, is capable of producing spherical elemental selenium inclusion bodies having an average diameter in the range of 50-500 nm when about 1-100 mg/L selenium was added to the medium in the form of selenite ions, particularly in the form of sodium selenite. In these bacteria, selenite concentrations above 1-2 mg/L seemingly induce detoxification processes, whereby the bacterium reduces selenite and excretes selenium intracellularly in elemental form. Elemental selenium produced thereby has a high degree of purity, is spherical, and its size and crystalline form depends on the bacterium species applied.

More particularly, we have found that aerobic non-selenium-respiring bacteria, particularly lactic acid bacteria (such as *Lactobacillus bulgaricus, Lactobacillus acidophillus, Bifidobacterium bifidum, Streptococcus thermophilus, Lactobacillus casei, Lactobacillus rhamnosus, Bifidobacterium longum*) grown in lactobaccillus culture broth (MRS, according to De Man, Rogosa and Sharpe) medium containing selenium in the form of selenite in concentration greater than 1 mg/ml and advantageously without agar are capable of reducing selenite anions to elemental selenium and accumulate it intracellularly. Milk can also be used as medium instead of culture broth. We have also observed that proliferation of the applied bacteria is inhibited in mediums containing selenium as selenite in concentrations higher than 200 mg/L.

The present invention advantageously enables the production of red and gray elemental selenium nanospheres in high purity by using industrially conveniently applicable bacteria, e.g. bacteria applied in the food industry. The size and the crystalline form of the produced nanosized (50-500 nm) spherical particles is defined by the selected microorganism. This genetic pre-determination results in reproducible production of a material having individual characteristics which can be used in numerous fields of industry and research.

DETAILED DESCRIPTION OF THE INVENTION

For example, the following publicly available deposited strains can be used in the processes of the invention:

| | |
|---|---|
| *Bifidobacterium bifidum* | NCAIM B 02021 |
| *Bifidobacterium longum* | ATCC 15707 |
| *Bifidobacterium infantis* | ATCC 15697 |
| *Lactobacillus acidophilus* | NCAIM B 02085 |
| *Lactobacillus delbrueckii* subsp. *bulgaricus* | NCAIM B 02206 |
| *Lactobacillus casei* | NCAIM B 1147 |
| *Lactobacillus plantarum* | ATCC 8014 |
| *Streptococcus thermophilus* | CNCM I-1670 |

NCAIM number refers to strains deposited at the National Collection of Agricultural and Industrial Microorganisms (Budapest, Hungary), while CNCM number refers to strain deposited at Pasteur Institute (Paris, France).

Elemental selenium produced thereby is spherical, and its size and crystalline form is defined by the bacterium species. It is not necessary for the process of the invention either to exclude air or to feed it in. The size and crystalline form of nanosized (50-500 nm) spherical particles is characteristic to and defined by the selected bacterium species being used.

Simplicity and rapidity of the technology and safety of the employed strains makes significant progress over the art in producing selenium nanospheres. Homogeneity and quality of the shape and size of elemental selenium nanoparticles produced chemically by other technology used in the art does not come close to the characteristics of the material prepared by the fermentation technology of the invention using e.g. lactic acid bacteria.

The process of the invention is suitable for producing elemental selenium nanospheres sized 50-500 nm, wherein the size distribution of nanospheres is generally characterized by a percentage deviation from the mean size of 5-20%.

Advantageously, the microorganism used in the process of the invention may be selected from the group consisting of the following species: *Lactobacillus bulgaricus, Lactobacillus acidophillus, Bifidobacterium bifidum, Streptococcus thermophilus, Lactobacillus casei, Lactobacillus rhamnosus* and *Bifidobacterium longum*.

By the use of microorganism belonging to the genus *Bifidobacterium*, grey selenium comprising 400-500 nm sized nanospheres can be produced.

Grey selenium comprising 400-500 nm sized nanospheres is advantageously produced by the use of microorganism belonging to the species *Bifidobacterium bifidum* or *Bifidobacterium longum*.

By the use of microorganism belonging to the genus *Lactobacillus*, red selenium comprising 100-300 nm sized nanospheres can be produced.

Red selenium comprising 100-300 nm sized nanospheres can be produced particularly by the use of microorganism belonging to the species *Lactobacillus bulgaricus, Lactobacillus acidophillus, Lactobacillus casei, Lactobacillus rhamnosus*.

In another preferred embodiment according to the invention red selenium is produced comprising 50-100 nm sized nanospheres by the use of microorganism belonging to the species *Streptococcus thermophilus*.

The process of the invention is advantageously performed by using a liquid medium containing carbon- and/or nitrogen-sources, inorganic ions and other organic materials as necessary.

The liquid medium applied contains selenium in the form of a selenite salt, advantageously in to the form of sodium selenite, advantageously in 2-200 mg/L concentration, more advantageously in 5-100 mg/L concentration and even more advantageously in 10-30 mg/L concentration.

Advantageously, the fermentation time is between 4 and 24 hours, advantageously between 4-8 hours.

Selenium can be recovered from the fermentation by digesting microorganisms enzymatically.

According to another preferred embodiment selenium is recovered from the fermentation by treatment with organic or inorganic acid or alkali.

Selenium can also be recovered by physical procedure, advantageously by freezing, drying, or by using osmosis.

Thereafter, recovery can also be achieved by aqueous washing, sedimentation or centrifugation of the obtained suspension.

The produced red selenium can also be converted by heat treatment to grey selenium.

In accordance with the above, the invention concerns a process for producing elemental selenium nanospheres, comprising the steps of a) growing non-selenium-respiring bacteria, advantageously under aerobic conditions, in a medium comprising selenite ions in a non-limiting concentration for a time period being sufficiently long for the formation of spherical elemental selenium inclusion bodies within said bacteria; and optionally b) partially or fully purifying said spherical elemental selenium inclusion bodies from said bacteria and/or medium.

In an advantageous embodiment, the used bacteria are obligate aerobic bacteria which are advantageously non-pathogenic, more advantageously also non-toxic and even more advantageously are selected from bacteria permitted for use in the food industry.

According to another advantageous embodiment of the process of the invention, the applied bacteria are selected from bacteria belonging to the genera *Bifidobacterium, Lactobacillus* or *Streptococcus* and advantageously are selected from the group consisting of the following species: *Lactobacillus bulgaricus, Lactobacillus acidophillus, Bifidobacterium bifidum, Streptococcus thermophilus, Lactobacillus casei, Lactobacillus rhamnosus* and *Bifidobacterium longum*.

Advantageously, the medium used for growing said bacteria is a liquid culture medium comprising selenium in 2-200 mg/L concentration, advantageously in 5-100 mg/L concentration, more advantageously in 10-30 mg/L concentration, in the form of a selenite salt, advantageously sodium selenite.

Advantageously, the length of said time period of growing said bacteria in the above defined step a) is 4-24 hours, advantageously 4-8 hours.

In a further advantageous embodiment of the process of the invention, said selenium nanospheres produced are grey selenium nanospheres being produced by using bacteria belonging to the genus *Bifidobacterium*, advantageously by using species *Bifidobacterium bifidum* or *Bifidobacterium longum*.

In another advantageous embodiment of the process of the present invention, said selenium nanospheres produced are red selenium nanospheres being produced by using bacteria belonging to the genera *Lactobacillus* or *Streptococcus*, advantageously by using *Lactobacillus bulgaricus, Lactobacillus acidophillus, Lactobacillus casei, Lactobacillus rhamnosus* or *Streptococcus thermophilus*.

The process of the invention may further comprise a step wherein said red selenium nano-spheres purified in the above-defined step b) are converted to grey selenium, advantageously by heat treatment.

The invention further concerns food additive compositions for human or animal consumption comprising selenium nanospheres obtainable by a process according to the invention. Advantageously, when used as a food additive, the nanospheres produced according to the processes of the invention need not be fully purified or purified at all because the medium and the bacteria applied in the production process may be fully suitable for human or animal consumption.

The invention further concerns isolated grey elemental selenium nanospheres directly obtainable by a process according to the invention.

The invention also relates to the use of elemental selenium nanospheres obtainable by a process according to the invention in the food, microelectronic or optical industry.

Generally, the process of the invention may be performed in the following steps and conditions.

1. Formulation and Inoculation of the Medium

Culture medium used for culturing microorganism may contain carbon source, nitrogen source, inorganic ions and, if necessary, other organic materials. Useful carbon sources can be exemplified by sugars, such as glucose, lactose, galactose, fructose and starch hydrolysate; alcohols, such as glycerol and sorbitol; organic acids, such as fumaric acid, citric acid and succinic acid.

Useful nitrogen sources can be exemplified by inorganic ammonium salts, such as ammonium sulphate, ammonium chloride and ammonium phosphate; corn steep liquor, yeast extract, peptone, meat extract, casein, tripcasin, soybean hydrolysate; ammonia gas and aqueous ammonia solution. The applied organic micronutrient source advantageously contains sufficient quantity of desired materials, such as vitamin B1 or L-isoleucine, or, alternatively, yeast extract max be used. In addition, potassium phosphate, magnesium sulphate, ferrous ions and manganous ions can be added. The medium may also contain buffer and antifoaming agent.

Culturing is carried out under aerobic conditions for 4-24 hours, advantageously for 4-8 hours.

Fermentation may be carried out in any known manner, for example by surface or submerged culturing.

Incubation temperature may be between about 35° C. and 45° C., depending on the employed strain.

pH is adjusted to between about 5 and 8 for the culture duration. For adjusting the pH, inorganic or organic acidic or basic materials as well as ammonia gas may be used.

According to an advantageous embodiment, a sterile solution of sodium selenite is added to the sterilized solution of agar-free culture broth for providing the sufficient selenium concentration.

2. Fermentation

Culture broth is incubated for 4-24 hours at the optimum temperature of the used bacteria, which is advantageously 37° C. for lactic acid bacteria, and in the case of *S. thermophilus*, at 42° C., respectively.

3. Recovery and Purification of Selenium

For the recovery of selenium from the medium and/or producing bacteria, bacteria are advantageously lysed enzymatically or killed by chemical (hydrochloric acid or sodium hydroxide) or physical means (freezing, drying or osmosis) to make the cellular content available. After that, elemental selenium nanospheres can be recovered in pure form by aqueous washing, sedimentation or centrifugation. Elemental selenium washed with 1M hydrochloric acid followed by deionized water may be used in the form of powder or aqueous suspension.

The process of the invention may also be accomplished in continuous fermentor.

Advantages of the invention over the prior art includes, among others, the following.

A novel technology for producing selenium nanospheres in homogeneous in form and size within a short period of time (4-24 hours) has been developed. Elements with metallic properties have not been previously produced by fermentation using non-toxic aerobic bacteria, advantageously using bacteria permitted for use in the food industry. Selenium produced this way is exceptionally good raw material for forming nanosurfaces because of its homogeneous particle size distribution and regular, spherical shape.

The technology developed is a manufacturing process which enables forming of a suspension as well as a powder containing valuable selenium spheres having unique characteristics. Material prepared in such a way can be used in the food industry as food or feed additive, in microelectronics as special semiconductor as well as in optical applications. The relative simplicity of the technology developed allows for significant decline in prices which can further broaden the range of useful high quality raw materials available.

The invention will be further illustrated below by some disclosed experimental examples. The skilled person will understand that the below described experiments are only presented for exemplifying several advantageous embodiments of the invention and are not intended to be used as anyway limiting the claimed scope of invention which, in turn, is defined by the appended claims. The person skilled in the pertinent art will certainly understand that many different modifications, alterations and substitutions by equivalent constituents or features may be performed with respect to the exemplified advantageous embodiments without significantly diverging from the spirit and scope of the invention and, therefore, such modifications, alterations and substitutions remain within the claimed scope of the invention.

EXAMPLES

Example 1

Production of Grey, Crystalline Selenium

Formulation and Inoculation of the Medium

Medium: MRS (DeMan, Rogosa and Sharpe, Scharlau Chemie, Barcelona, Spain, De Man, J. C., Rogosa, M. and Sharpe, M. E. (1960). A medium for the cultivation of lactobacilli (J. Appl Bacteriol. 23: 30-35.). By dissolving with heating 52 g material in 1 liter of water a culture broth having the following composition was obtained:

| Component | g/L |
|---|---|
| Peptone | 10.0 |
| Meat extract | 8.00 |
| Yeast extract | 4.00 |
| D(+)-Glucose | 20.0 |
| Sodium acetate | 5.00 |
| Triammonium citrate | 2.00 |
| Potassium hydrogen phosphate | 2.00 |
| Magnesium sulphate ($MgSO_4$) | 0.20 |
| Manganase sulphate ($MnSO_4$) | 0.05 |
| Polisorbate 80 | 1 ml |
| pH | 6.2 ± 0.2 |

Culture broth was sterilized at 121° C. for 15 minutes.

Sodium selenite (from 1000 mg/L solution) was added to the broth in an amount resulting in 20 mg/L final concentration of selenium in the broth, namely 20 ml of 1000 mg/L sodium selenite solution was added to 980 ml culture broth.

Inoculation

The solution prepared in this way and homogenized by stirring was inoculated with 30 ml of activated *Bifidobacterium bifidum* strain NCAIM B 02021. For the activation a 3 times activated strain originally being in freeze-dried form was used, which is derived from a strain deposited at the National Collection of Agricultural and Industrial Microorganisms, Faculty of Food Science, Corvinus University of Budapest (Somlói út 14-16, Budapest, H-1118, Hungary). After activation the absorbance value of the solution was 1.5±0.1 (measured at 650 nm wavelength).

Fermentation

Incubation was carried out in aseptically sealed vessel at 37° C. for 24 hours without shaking.

Figure 1:
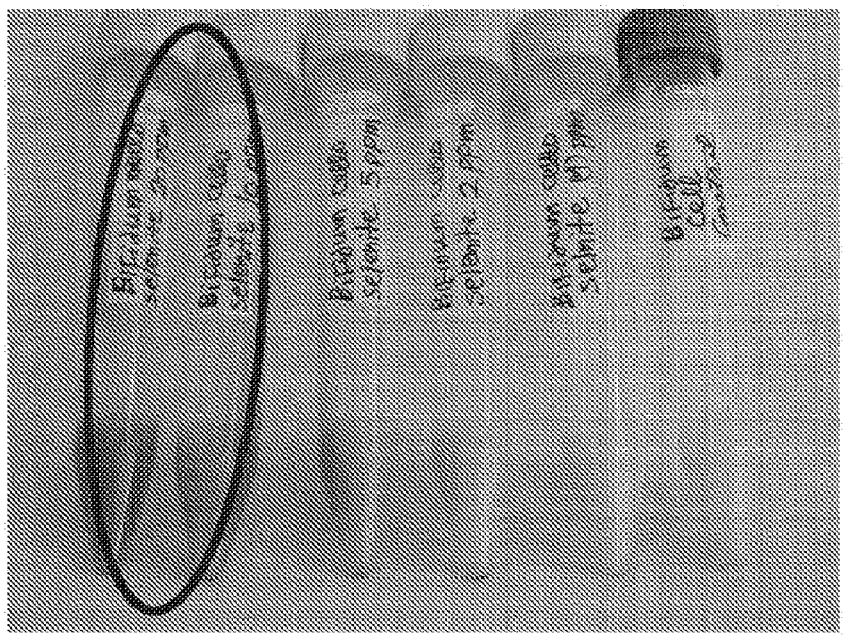
FIG. 1 is a photograph showing the suspensions of selenium nanospheres obtained in experiments where *Bifidobacterium bifidum* (NCAIM B 02021) bacteria were used in accordance with the process of the invention where the growth medium has comprised different concentrations of sodium selenite. On the original colored photograph it can be clearly seen that the produced selenium is in the grey crystalline form which was also confirmed by X-ray diffraction analysis.

By the end of the process a grey colored suspension was obtained as can be seen in FIG. 1, framed.

Figure 2:
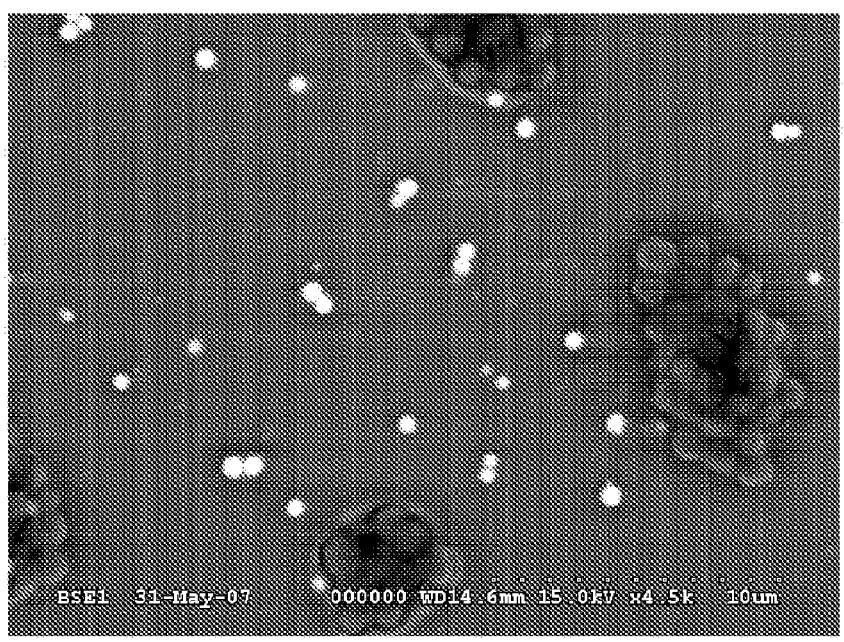
FIG. 2 is an electro micrograph showing the product of a fermentation process according to the invention performed using *Bifidobacterium bifidum* (NCAIM B 02021) bacteria after partial lysozyme treatment. The elemental selenium nanospheres released into the intercellular space can be analyzed by scanning electron microscope.

After lysing a portion of the bacteria present in the suspension by lysozyme, selenium nanospheres that got excreted into the intercellular space can be observed and analyzed by scanning electron microscope, as shown in FIG. 2.

Figure 3:
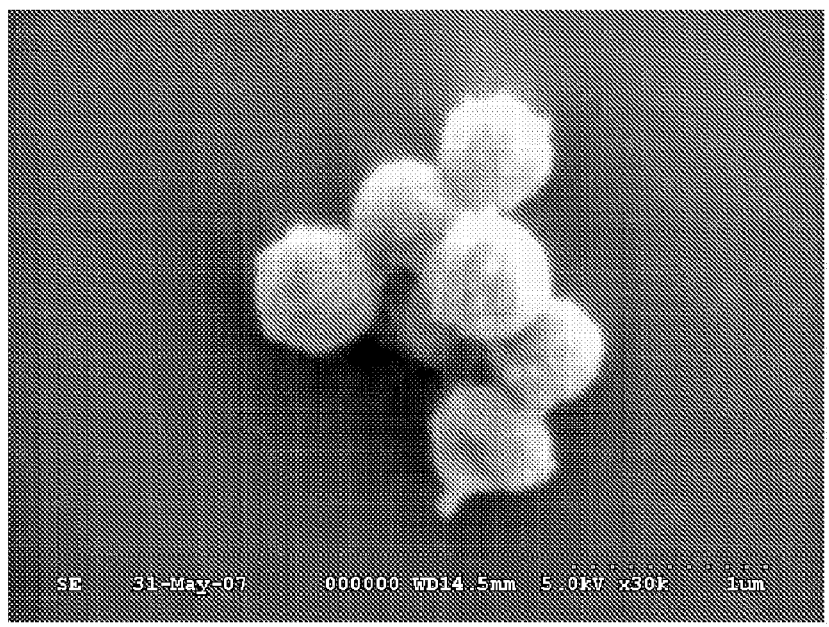
FIG. 3 is a scanning electron micrograph of the isolated product of a fermentation performed according to the invention by the use of *Bifidobacterium bifidum* (NCAIM B 02021). The shown highly illuminating 500 nm sized spheres are elemental selenium nanospheres. It can be seen that the sizes of the individual nanospheres are highly uniform.

The highly luminous 500 nm sized spheres observable in the picture are the elemental selenium particles. There is no significant difference in the size of individual spheres, as can be seen in FIG. 3.

Figure 4:
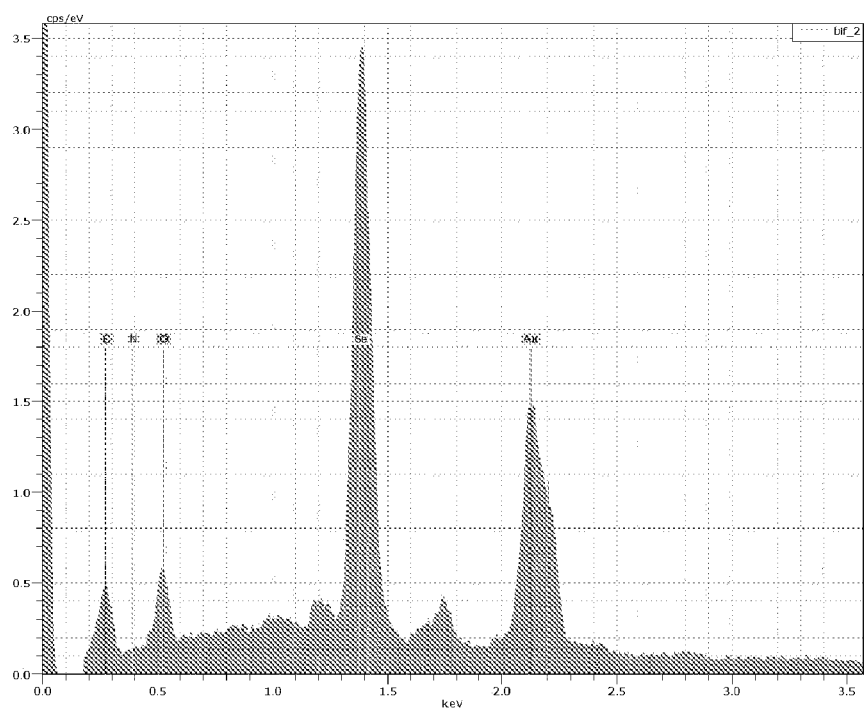
FIG. 4 is a plot showing the X-ray fluorescent spectrum of a selenium nanosphere produced according to the invention verifying that the particle is, in fact, comprised of elemental selenium. The signal of gold also present in the plot can be attributed to the gold layer evaporated onto the sample during sample pre-treatment, signals of carbon, nitrogen and oxygen originate from the surrounding organic matrix, and the signals of sodium and silicon originate from the sample holding glass plate.

By using X-ray fluorescent analysis for determining the composition of particles the spectrum shown in FIG. 4 was obtained.

As the X-ray fluorescent spectrum demonstrates, the particle is elemental selenium. Gold signal present is derived from the layer deposited by thermal evaporation on the sample during sample preparation; carbon, nitrogen and oxygen are derived from the surrounding organic matrix, while the signal of sodium and silicon is derived from the sample holding glass plate.

Recovery and Purification of Selenium

After 24 hours of incubation, the sample was centrifuged at 4500×g for 20 minutes at 10° C. The supernatant was discarded, cellular mass was washed three times with 50 mM Tris-HCl (pH=7.5). The dry weight of washed cellular mass was 1.3±0.3 g. To this wet sample 500 μl 0.5 mg/ml lysozyme dissolved in 10 mM Tris-HCl (pH=8) was added. The sample was incubated for 12 hours at room temperature. After the incubation period, the sample lysed by lysozyme was centrifuged at 4500×g for 20 minutes at 10° C. and washed three times with deionized water. After drying at 40° C., grey colored powder was obtained. Its X-ray diffraction analysis verified that it contained the hexagonal grey crystalline form of selenium.

Example 2

Preparation of Grey Selenium Via Amorphous Red Selenium Intermediate

Formulation and Inoculation of the Medium

Medium used: MRS

Culture broth was sterilized at 121° C. for 15 minutes, after which sodium selenite (from 1000 mg/L solution) was added to the broth in an amount resulting in 20 mg/L final selenium concentration of the broth, namely 20 ml of 1000 mg/L sodium selenite solution was added to 980 ml culture broth.

Inoculation

The solution prepared this way and homogenized by stirring was inoculated with 30 ml of activated *Lactobacillus acidophilus* strain NCAIM B 02085. For the activation a 3 times activated strain originally being in freeze-dried form was used, which was derived from a strain being deposited at the National Collection of Agricultural and Industrial Microorganisms, Faculty of Food Science, Corvinus University of Budapest (Somlói út 14-16, Budapest, H-1118, Hungary). After activation the absorbance value of the solution was 1.5±0.1 (measured at 650 nm wavelength).

Fermentation

The inoculated broth was incubated at 37° C. for 24 hours. By the end of the process, a red colored suspension was obtained. The size of selenium nanospheres produced was 200±20 nm. To 1000 ml of the suspension 100 ml cc. HCl was added and boiled for 30 minutes with the aid of a reflux cooler. 100 ml aliquots of the cooled mixture were centrifuged at 4500×g for 20 minutes at 10° C. Supernatant was discarded and the cellular mass was washed three times with deionized water. After drying at 40° C. red colored powder was obtained, the X-ray diffraction analysis of which verified that it contained the red amorphous modification of selenium. Keeping the dried sample at 105° C. for 1 hour the red modification was converted into the grey modification.

Example 3

Preparation of Monoclinic Red Selenium

Formulation and Inoculation of the Medium

Medium: M17 selective culture broth (Shankar, P. A. and Davies, F. L.: A note on the suppression of *Lactobacillus bulgaricus* in media containing glycerophosphate and application of the media to selective isolation of *Streptococcus thermophilus* from yoghurt. J. Soc. Dairy Technol. 30 (1): 28., 1977) for *Streptococcus thermophilus*. By dissolving 37 g powder in 1 liter of water the following composition was obtained:

| Component | g/L |
| --- | --- |
| Tripton | 2.50 |
| Meat peptone | 2.50 |
| Soy peptone | 5.00 |
| Yeast extract | 2.50 |
| Meat extract | 5.00 |
| Sodium glycerophosphate | 19.0 |
| Magnesia sulphate (MgSO$_4$) | 0.25 |
| Ascorbinic acid | 0.50 |
| pH | 6.5 |

Culture broth sterilized at 121° C. for 15 minutes. Sodium selenite (from 1000 mg/L solution) was added to the culture broth in an amount resulting in 20 mg/L final selenium concentration of the broth, namely 20 ml of 1000 mg/L sodium selenite solution was added to 980 ml culture broth.

Inoculation

The solution prepared this way and homogenized by stirring was inoculated with 30 ml of activated *Streptococcus thermophilus* strain. For the activation 3 times activated strain originally being available in freeze-dried form was used, which is derived from a strain deposited at the National Collection of Agricultural and Industrial Microorganisms, Faculty of Food Science, Corvinus University of Budapest (Somlói út 14-16, Budapest, H-1118, Hungary). After activation, the absorbance value of the solution was 1.5±0.1 (measured at 650 nm wavelength).

Fermentation

The culture broth was incubated at 37° C. for 24 hours. By the end of the process a red colored suspension was obtained. To 1000 ml of the suspension 100 ml 1M NaOH solution was added and boiled for 30 minutes with the aid of a reflux cooler. 100 ml aliquots of the cooled mixture were centrifuged at 4500×g for 20 minutes at 10° C. Supernatant was discarded and the cellular mass was washed three times with deionized water. After drying at 40° C. red colored powder was obtained, the crystalline form of which was verified by X-ray diffraction analysis. The size of the selenium spheres prepared was 100 nm. The red monoclinic allotropic modification of elemental selenium was produced.

Materials produced in examples 1-3 are remarkably different from each other because of their various crystalline forms.

Recovery and Purification of Selenium

The recovery of selenium from the culture medium may be independent of the employed strain. Selenium nanospheres may be used in the form of a powder or a suspension. With this object the sample obtained after fermentation is dried at 105° C. or bacteria are lysed enzymatically or killed by chemical (hydrochloric acid or sodium hydroxide) or physical means (freezing, drying or osmosis) to make the cellular content available. After that, elemental selenium can be recovered in pure form by aqueous washing (subsequent to pH adjustment), sedimentation and centrifugation. Elemental selenium washed with 1M hydrochloric acid, followed by deionized water may be considered as an appropriate end-product of the technology in the form of powder or aqueous suspension. Red selenium spheres can be converted to the grey modification by heat treating for 1-2 hours at temperatures above 75° C., particularly in the range of 100 to 200° C.

The present invention provides the first industrially applicable fermentation based method for the production of elemental selenium nanospheres of highly uniform size within the 50-500 nm range. The actual size and crystalline form of the produced selenium nanospheres depends on the species of bacterium used for production. The development of the novel methods of the invention were enabled by the highly surprising finding that all of the so far tested non-selenium-respiring aerobic bacteria, advantageously including lactobacilli which are safely used in food and feed industry for a long time, can also reduce selenite ions present in the culture medium in a non-limiting concentration to elemental selenium and form spherical elemental selenium inclusion bodies of highly uniform size. The present invention is also the first demonstration of a bacterial fermentation process directly resulting in the metallic grey crystalline form of elemental selenium (without needing any subsequent heat treatment).

The processes of the invention enable for the first time the development of economical large scale industrial fermentation methods for the production of elemental selenium nanospheres of highly uniform size being within the range of 50-500 nm. The resulting high quality elemental selenium material will surely find many important industrial uses, e.g. as raw material in the microelectronic and optical industries and also as highly valuable food and feed additive.

The invention claimed is:

1. A process for producing uniformly sized elemental selenium nanospheres having an average diameter in the range of 50-500 nm, comprising the steps of
   a) growing non-toxic non-selenium-respiring bacteria in a medium comprising selenite ions in a non-limiting concentration for a time period being sufficiently long for the formation of spherical elemental selenium inclusion bodies within said bacteria, wherein said bacteria are selected from bacteria belonging to the genera *Bifidobacterium, Lactobacillus* or *Streptococcus*, and wherein said medium used for growing said bacteria is a liquid culture medium comprising selenium in 2-200 mg/L concentration, in the form of a selenite salt; and
   b) partially or fully purifying said spherical elemental selenium inclusion bodies from said bacteria and/or medium,
   wherein the actual size of said nanospheres produced being defined by the specific bacterium species selected in step a).

2. Process according to claim 1, wherein the length of said time period of growing said bacteria in step a) is 4-24 hours.

3. Process according to claim 1, wherein said selenium nanospheres produced are grey selenium nanospheres being produced by using bacteria belonging to the genus *Bifidobacterium*.

4. Process according to claim 1, wherein said selenium nanospheres produced are red selenium nanospheres being produced by using bacteria belonging to the genera *Lactobacillus* or *Streptococcus*.

5. Process according to claim 4, further comprising a step wherein said red selenium nanospheres purified in step b) are converted to grey selenium.

6. Process according to claim 4, wherein said selenium nanospheres produced are red selenium nanospheres having an average diameter in the range of 100-300 nm being produced using a microorganism belonging to the species *Lactobacillus bulgaricus, Lactobacillus acidophillus, Lactobacillus casei, Lactobacillus rhamnosus*.

7. Process according to claim 4, wherein said selenium nanospheres produced are red selenium nanospheres having an average diameter in the range of 50-100 nm being produced using a microorganism belonging to the species *Streptococcus thermophilus*.

8. The process of claim 1, wherein the non-toxic non-selenium-respiring bacteria are grown in step a) under aerobic conditions.

9. The process of claim 1, wherein said bacteria are selected from the group consisting of the following species: *Lactobacillus bulgaricus, Lactobacillus acidophillus, Bifidobacterium bifidum, Streptococcus thermophilus, Lactobacillus casei, Lactobacillus rhamnosus* and *Bifidobacterium longum*.

10. The process of claim 1, wherein said medium used for growing said bacteria is a liquid culture medium comprising selenium in 5-100 mg/L concentration in the form of sodium selenite.

11. The process of claim 1, wherein the length of said time period of growing said bacteria in step a) is 4-8 hours.

12. The process of to claim 1, wherein said selenium nanospheres produced are grey selenium nano spheres being produced by using bacteria belonging to the species *Bifidobacterium bifidum* or *Bifidobacterium longum*.

13. The process of claim 1, wherein said selenium nanospheres produced are red selenium nanospheres being produced by using bacteria belonging to the species Lactobacillus bulgaricus, *Lactobacillus acidophillus, Lactobacillus casei, Lactobacillus rhamnosus* or *Streptococcus thermophilus*.

14. Food additive composition for human or animal consumption comprising selenium nanospheres obtainable by a process according to claim 1.

15. Isolated grey elemental selenium nanospheres directly obtainable by a process according to claim 3.

16. A method of improving human or animal nutrition comprising adding to human food or animal feed bacteria which comprise uniformly sized elemental selenium nanoshperes having an average diameter in the range of 50-500 nm produced according to step a) of claim 1.

17. A method of improving the electric or optical properties of a composition of matter to be used in the microelectronic or optical industry comprising adding the nanospheres obtained by the process of claim 1 to said composition of matter.

18. The method of claim 17 wherein the composition of matter is used in a photocopier.

19. The method of claim 17 wherein the composition of matter is used in a microelectronic circuit.

20. The method of claim 17 wherein the composition of matter is a nanowire.

* * * * *